United States Patent
Tseng et al.

(10) Patent No.: US 6,813,668 B2
(45) Date of Patent: Nov. 2, 2004

(54) MULTI-FUNCTIONAL ELECTRONIC CARD CAPABLE OF DETECTING REMOVABLE CARDS

(75) Inventors: Chien-Chih Tseng, Ta Li (TW); Jui Chung Chen, Kaohsiung Hsien (TW); Ping-Chang Liu, Chu Pei (TW); Sidney Young, Hsinchu (TW)

(73) Assignees: C-One Technology Corp., Hsin-Chu (TW); Pretec Electronics Corp., Fremont, CA (US)

( * ) Notice: Subject to any disclaimer, the term of this patent is extended or adjusted under 35 U.S.C. 154(b) by 177 days.

(21) Appl. No.: 10/207,856

(22) Filed: Jul. 31, 2002

(65) Prior Publication Data

US 2003/0154326 A1 Aug. 14, 2003

(30) Foreign Application Priority Data

Feb. 8, 2002 (TW) ...................................... 91201620 U

(51) Int. Cl.$^7$ ............................................ G06F 13/00
(52) U.S. Cl. ................. 710/301; 710/2; 710/8; 710/13; 710/62; 710/73; 710/74; 710/302
(58) Field of Search ........................... 710/2, 8, 13, 62, 710/73, 74, 301, 302

(56) References Cited

U.S. PATENT DOCUMENTS

| | | | | |
|---|---|---|---|---|
| 5,589,719 A | * | 12/1996 | Fiset | 307/131 |
| 5,613,092 A | * | 3/1997 | Lim et al. | 710/301 |
| 5,727,168 A | * | 3/1998 | Inoue et al. | 710/301 |
| 6,470,284 B1 | * | 10/2002 | Oh et al. | 702/64 |
| 2002/0144025 A1 | * | 10/2002 | Poisner et al. | 710/15 |
| 2003/0038177 A1 | * | 2/2003 | Morrow | 235/441 |
| 2003/0082961 A1 | * | 5/2003 | Mowery et al. | 439/894 |
| 2003/0084220 A1 | * | 5/2003 | Jones et al. | 710/301 |

* cited by examiner

Primary Examiner—Jeffrey Gaffin
Assistant Examiner—Justin Knapp
(74) Attorney, Agent, or Firm—Bacon & Thomas, PLLC

(57) ABSTRACT

A multi-functional electronic card capable of detecting removable cards includes at least one functional device, a controller, a host interface, and a removable card interface. The host interface has a card detecting pin fixed at a level representing that a card is inserted. The removable card interface has an elastic switch connected to the device detecting pin of the controller. The controller detects event and status of a card insertion and removal by a level change of the device detecting pin for setting the event and status in a status register, and informs the host device through the host interface so that the host device reads the status register to determine whether the removable card is inserted or removed.

10 Claims, 2 Drawing Sheets

MULTI-FUNCTIONAL ELECTRONIC CARD CAPABLE OF DETECTING REMOVABLE CARDS

BACKGROUND OF THE INVENTION

1. Field of the Invention

The present invention relates to an electronic card, and more particularly to a multi-functional electronic card capable of detecting removable cards.

2. Description of the Related Art

With the progress of the electronic technology, the electronic device is getting smaller. Examples of such electronic devices are notebook computers, palm computers, or personal digital assistants (PDAs). These small-sized electronic devices are portable and can provide processing capability to the users, thereby providing a great convenience to the users. However, since the size is small, such an electronic device is only provided with basic processing circuitry, while functions of some other circuit modules, such as external memories, modems, area network cards, etc., can only be realized by inserting corresponding electronic cards into the electronic device. These electronic cards can also be inserted to a personal computer for data exchange or storage.

Conventionally, the aforementioned electronic cards are connected to a host board adaptor (HBA) of the host system through a CF (compact flash) or PCMCIA interface. To make the host aware of whether the electronic card is inserted or removed, the PCMCIA/CF interface defines the card detecting pins CD#1 and CD#2, which are floating normally, and when the electronic card is inserted, are changed to be grounded. Therefore, when the HBA has detected that the CD#1 and CD#2 are grounded, it informs the host that a card has been inserted for performing a starting procedure. Accordingly, it is able to automatically detect the insertion/removal status of the electronic card.

To make the host device to be connected to more electronic peripheral cards with different interfaces, for example, Smart Media card, MMC (Multi-Medium Card) card, SD (Secure Digital) card, Memory Stick card, or PIC (Personal Information Carrier), a card adapter serves to connect these electronic cards to the PCMCIA/CF interface of the host device, as shown in FIG. 1. The card adapter 11 is provided with an elastic switch 13 in the card slot 12. One end of the elastic switch 13 is grounded, and the other end is connected to the CD#1 and CD#2 pins of the PCMCIA/CF interface 111 and further connected to the system high voltage when the card adapter 11 is inserted into the HBA 151 of the host system 15. When the electronic card, such as Smart Media card, MMC card, SD card, Memory Stick card, or PIC card has not been inserted into the card adapter 11, the elastic switch 13 is disconnected and thus the CD#1 and CD#2 pins are at high voltage level, so that the host system 15 does not supply power to the PCMCIA/CF interface. On the contrary, when the electronic card is inserted into the card adapter 11, the elastic switch 13 of the card slot 12 is pressed to be conducted so that the CD#1 and CD#2 pins are grounded, thereby pulling the voltage level from a high level down to a low level. The HBA 151 thus detects such an insertion status of the card, and then informs the host 152 to supply power of the PCMCIA/CF interface to perform a starting procedure.

The use of the above-described CD#1 and CD#2 pins can achieve the purpose of automatically detecting the insertion/removal status of the electronic card. However, in the practical application, if the electronic card is inserted arbitrarily, the power supplied to the PCMCIA/CF interface may be interrupted arbitrarily, which makes the PCMCIA/CF interface be in a tri-state and results in a system error. Besides, when the electronic card is removed and then is inserted again, the host system must re-supply power to the PCMCIA/CF interface and perform the starting procedure again. Therefore, the host system must wait for the power supply to be stable and the completion of the starting procedure for accessing the electronic card. Moreover, in realizing a multi-functional electronic card in which a plurality of functional devices are provided in one card and one of the functional devices is implemented as a removable device, it is possible that other functional devices will be powered off and cannot be used when this removable functional device is removed. Therefore, the conventional electronic cards still have many defects required to be improved.

SUMMARY OF THE INVENTION

Accordingly, the objective of the present invention is to provide a multi-functional electronic card capable of detecting removable cards to eliminate the problems in the conventional skill.

To achieve the objective, the multi-functional electronic card capable of detecting removable cards in accordance with the present invention includes: at least one functional device; a controller having a status register and a device detecting pin; a host interface for inserting into a host device, the host interface having a card detecting pin fixed at a level representing that a card is inserted; and a removable card interface for being inserted with a removable card with other functional device, the removable card interface having an elastic switch connected to the device detecting pin of the controller, the elastic switch being on or off due to insertion or removal of the removal card so as to change a level of the device detecting pin, wherein the controller detects event and status of a card insertion and removal by a level change of the device detecting pin for being set in the status register, and informs the host device through the host interface so that the host device reads the status register to determine whether the removable card is inserted or removed.

The various objects and advantages of the present invention will be more readily understood from the following detailed description when read in conjunction with the appended drawing.

DETAILED DESCRIPTION OF THE INVENTION

Figure 1:
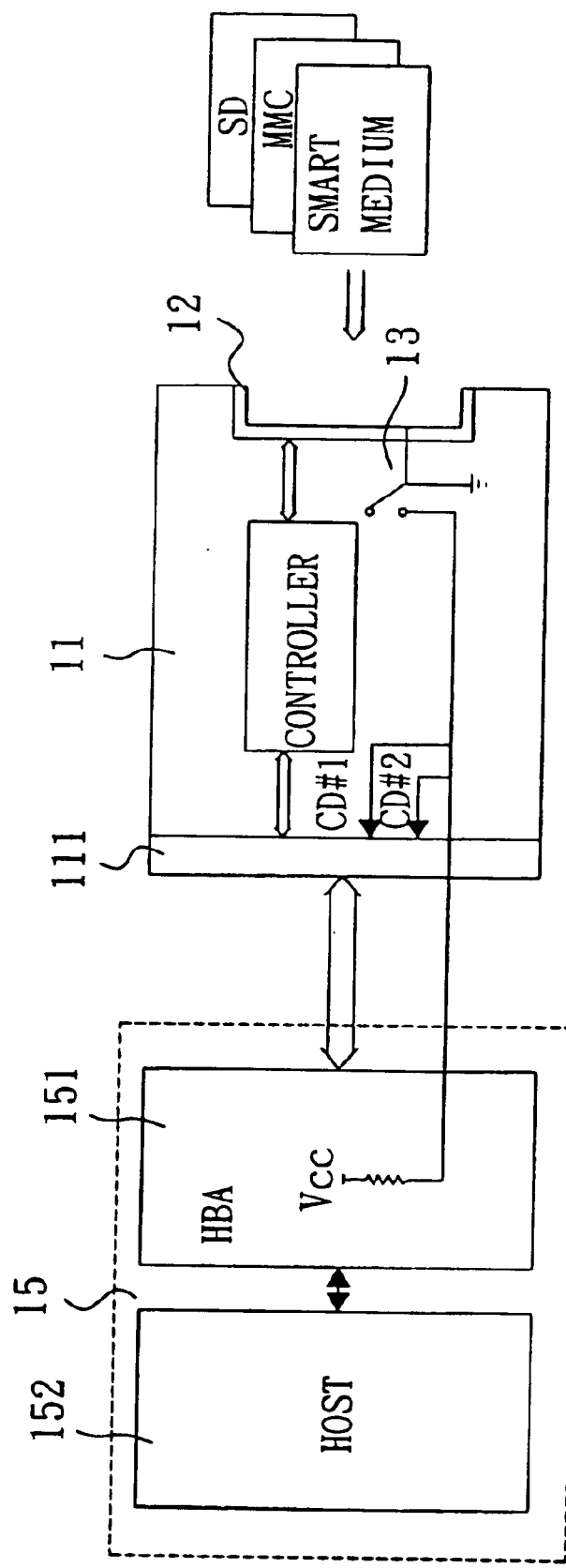
FIG. 1 is a structure diagram showing that an electronic card is connected to the PCMCIA/CF interface through a card adapter.
Figure 2:
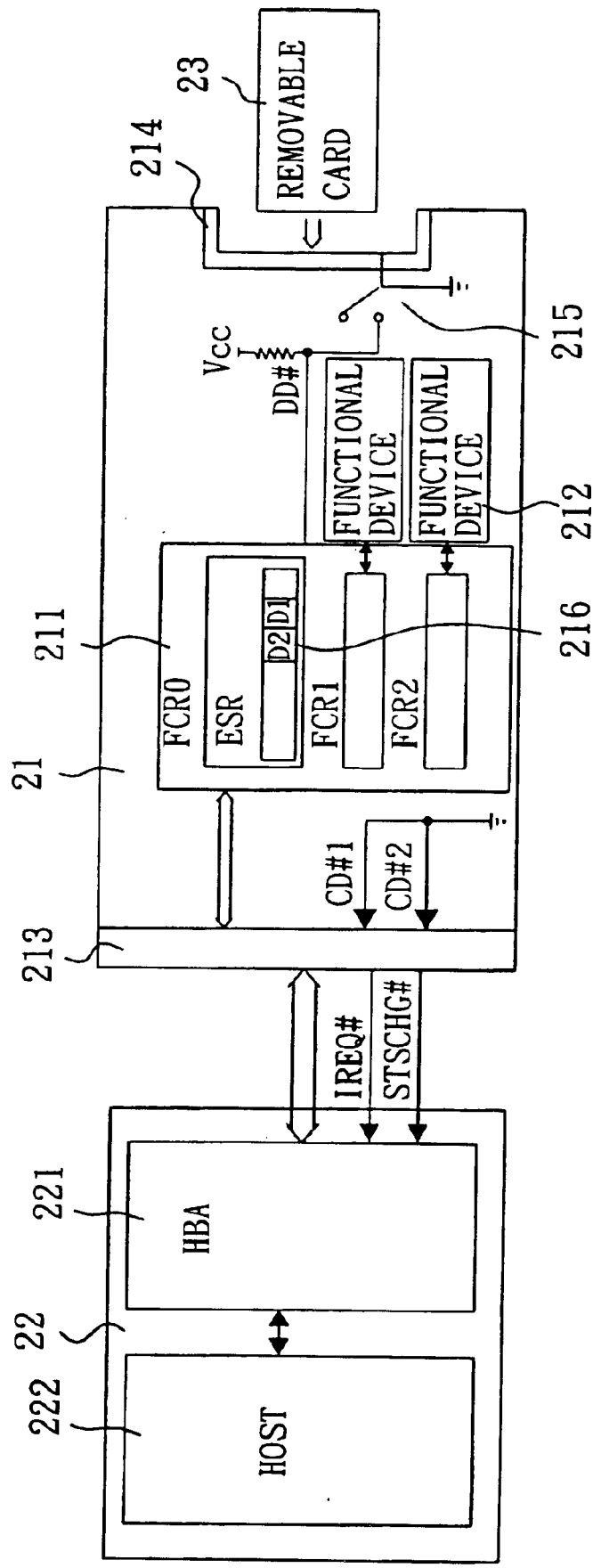
FIG. 2 shows the structure of the multi-functional electronic card capable of detecting removable cards in accordance with the present invention.

A preferred embodiment of the multi-functional electronic card capable of detecting removable cards in accordance with the present invention is illustrated in FIG. 2, which includes a controller 211, at least one functional device 212, a host interface 213 and a removable card interface 214. The functional device 212 can be a memory, an area network controller, or a modem module generally implemented in an electronic card. The host interface 213 is preferred to be a PCMCIA/CF interface 111, thereby making the multi-functional electronic card of the present invention to be inserted into a HBA 221 of a host system 22. The removable card interface 214 serves to be inserted by a removable electronic card 23 with other functional device. The removable card can be a Smart Media card, a MMC card, a SD card, a Memory Stick card, or a PIC card, etc.

In the multi-functional electronic card capable of detecting removable cards 21, the card detecting pints in the host interface are fixed at a level representing that a card is inserted. In this embodiment, the pins are fixed to ground. Namely, the CD#1 and CD#2 pins originally designed int eh PCMCIA/CF interface are always at low level. The removable card interface 214 is provided with an elastic switch 215. One end of this elastic switch 215 is grounded and the other end is connected to a device detecting pin DD# of the controller 211, whereby the controller 211 can detect the on/off status of the elastic switch 215. The device detecting pin DD# is further connected to a pull-high resistor. When the removable card 23 has not been inserted into the removable card interface 214, the elastic switch 215 of the removable card interface 214 is at an off status, and thus the potential of the device detecting pin DD# is at a high level. When the removable card 23 is inserted into the removable card interface 214, the elastic switch 215 of the removable card interface 214 is pressed by the removable card 23 to conduct, whereby the device detecting pin DD# is grounded and the potential changes from high level to low level. The change of voltage level can be detected by the controller 211.

The controller 211 has a status register 216, for example, Extended Status Register (ESR) of an Function Control Register (FCR) defined in an attribute memory of the PCMCIA/CF specification. Two reservation bits in the status register 216 are used to define whether the removable card interface 214 is inserted with a card and the occurrence of an insertion/removal event in the removable card interface 214. For example, the bits D1 and D2 of the ESR are defined as the following:

D1 bit is defined to represent whether the removable card 23 is inserted into the removable card interface card 214. If D1 is 0, it represents that the removable card 23 is not inserted into the removable card interface 214. If D1 is 1, it represents that the removable card 23 has been inserted into the removable card interface 214.

The D2 bit is defined to respond to an event of removing the removable card 23, from the removable card interface 214.

With the DD# pin, D1 bit and D2 bit, when the removable card 23 is inserted into or removed from the removable card interface 214, the controller 211 can detect the level change of DD# pin for setting the D1 and D2 bits. In details, when the removable card 23 has been inserted into the removable card interface 214, the level of the DD# pin is changed from high to low, and thus the controller 211 knows the occurrence of card insertion and sets the D2 bit to 1. Since the changed level of the DD# pin is low, the D1 bit is set to 1. When the removable card 23 is removed from the removable card interface 214, the level of DD# pin is changed from low to high, and thus the controller 211 knows the occurrence of card removal and sets the D2 bit to 1. Since the changed level of the DD# pin is high, the D1 bit is set to 0.

To make the host system 22 aware the insertion or removal of the removable card 23, the controller 211 has to indicate the change of the DD# pin to the host system 22 through the host interface 213 so that the host system 22 can read the values of the D1 bit and D2 bit of the controller 211 through the host interface 213 for determining whether the removable card 23 is inserted or removed, so as to perform a starting or closing procedure.

For example, the controller 211 can utilize the level change of the DD# pin to trigger the IREQ# pin or STSCHG# pin defined in the PCMCIA/CF interface. In triggering the IREQ# pin, when the level of the DD# pin is changed, the controller 211 sends an interrupt signal to the host system 22 through the IREQ# pin. After receiving the interrupt, the host 222 identifies the source of the interrupt by reading D1 bit and D2 bit. If it is determined that this interrupt is issued due to the insertion or removal of the removable card 23, the host system 22 will perform the related starting or closing procedure and set the D2 bit to 0 for detecting the next insertion/removal event. In triggering the STSCHG# pin, when the level of the DD# pin is changed, the controller 211 will assert the STSCHG# pin. When the HBA 221 knows that the STSCHG# pin has been set, an interrupt of status change will be issued and then transferred to the host 222. The host system 22 reads the D1 bit and D2 bit through the host interface 213 for performing related starting or closing process, and then sets the D2 bit to 0 for detecting the next insertion/removal event.

In view of the foregoing, it is apparent that the multi-functional electronic card of the present invention can detect the card insertion/removal status of, for example, a Smart Media card, MMC card, SD card, Memory Stick card, or PIC cards, etc., by the DD# pin of the removable card interface 214. The status register 216 records the occurrence and status of card insertion/removal event. Moreover, the interrupt or polling procedure is used to inform the host system 22 to achieve the object of automatic detection. The advantages of the present invention are as follows:

(1) The functional device of the multi-functional electronic card of the present invention is realized by a removable manner. The insertion or removal of the removable card with such a functional device will not affect the operation of the other functional devices.

(2) When the removable card is removed, the multi-functional electronic card is aware of such a status, and thus reduces the power supply to a level for only sustaining other functional devices, thereby, achieving the object of power saving.

(3) When the removable card is removed, since only the power supply of the removed card is interrupted, the power supply of other portion of the multi-functional electronic card is still sustained at a predetermined level. Therefore, once the removable electronic card is inserted, the starting procedure can be completed more quickly, whereby the host can readily access the functional device of the multi-functional electronic card.

(4) If the removable card is plugged or removed arbitrarily, the multi-functional electronic card of the present invention makes the host device release the PCMCIA/CF interface by the level change of the IREQ# pin and STSCHG# pin, thereby avoiding any possible error.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multi-functional electronic card capable of detecting removable cards, said multi-functional electronic card comprising:

at least one functional device;

a controller having a status register and a device detecting pin, wherein the status register is an Extended Status Register (ESR) of a Function Control Register (FCR) defined in an attribute memory of the electronic card according to a PCMCIA/CF specification and has first bit and a second bit;

a host interface arranged to be inserted into a host device, the host interface having a card detecting pin fixed at a level representing that the card has been inserted into the host device; and a removable card interface into which a removable card with another function device may be inserted, the removable card interface having an elastic switch connected to the device detecting pin of the controller, the elastic switch being on or off due to insertion or removal of the removable card so as to change a level of the device detecting pin;

wherein, in response to a level change of the device detecting pin, the first bit status register indicates whether the removable card is inserted into the removable card interface and the second bit of the status register indicates an occurrence of insertion and removal of removable card to and from the removable card interface, and wherein the controller detects the occurrence and status of card insertion and removal based on said first and second bits in the status register and informs the host device through the host interface so that the host device reads the status register to determine whether the removable card is inserted or removed.

2. The multi-functional electronic card capable of detecting removable cards as claimed in claim 1, wherein the host interface is a PCMCIA/CF interface whose CD#1 and CD#2 pins are always grounded.

3. The multi-functional electronic card capable of detecting removable cards as claimed in claim 2, wherein the elastic switch has a first end connected to ground and a second end connected to the device detecting pin of the controller, and the device detecting pin is connected to a pull-high resistor, such that, when the removable card is not inserted into the removable card interface, the elastic switch is off and the device detecting pin is at a high level, when the removable card is inserted into the removable card interface, the elastic switch is pressed by the card to conduct and the device detecting pin is grounded and has a level change from high to low, and when the removable card is removed from the removable card interface, the device detecting pin has a level change from low to high.

4. The multi-functional electronic card capable of detecting removable cards as claimed in claim 1, wherein when the first bit is 1, the removable card is not inserted into the removable card interface, and when the first bit is 1, the removable card has been inserted into the removable card interface.

5. The multi-functional electronic card capable of detecting removable cards as claimed in claim 4, wherein the host interface is a PCMCIA interface, the controller utilizes a level change of the device detecting pin to trigger an IREQ# pin defined in the PCMCIA/CF interface for issuing an interrupt to the host device, and the host device reads the first and second bits for identifying a source of the interrupt.

6. The multi-functional electronic card capable of detecting removable cards as claimed in claim 4, wherein the host interface is a PCMCIA interface, the controller utilizes a level change of the device detecting pin to trigger an STSCHG# pin defined in the PCMCIA/CF interface for setting the STSCHG# pin, and when the host device knows that the STSCHG# pin has been set, the host device reads the first and second bits through the host interface.

7. The multi-functional electronic card capable of detecting removable cards as claimed in claim 1, wherein the second bit is changed from 0 to 1 when the removable card is inserted into or removed from the removable card interface.

8. The multi-functional electronic card capable of detecting removable cards as claimed in claim 7, wherein the host interface is a PCMCIA interface, the controller utilizes a level change of the device detecting pin to trigger an IREQ# pin defined in the PCMCIA/CF interface for issuing an interrupt to the host device, and the host device reads the first and second bits for identifying a source of the interrupt.

9. The multi-functional electronic card capable of detecting removable cards as claimed in claim 7, wherein the host interface is a PCMCIA interface, the controller utilizes a level change of the device detecting pin to trigger an STSCHG# pin defined in the PCMCIA/CF interface for setting the STSCHG# pin, and when the host device knows that the STSCHG# pin has been set, the host device reads the first and second bits through the host interface.

10. The multi-functional electronic card capable of detecting removable cards as claimed in claim 1, wherein the removable card is a Smart Media card, a MMC card, a SD card, a Memory Stick card, or a PIC card.

* * * * *